(Model.)

L. E. ADAMS.
EGG POACHER.

No. 244,415. Patented July 19, 1881.

Witnesses:
Walter Fowler,
T. D. D. Ourand.

Inventor:
Lorenda E. Adams
by Heylmann & Kane
Attorneys.

UNITED STATES PATENT OFFICE.

LORINDA E. ADAMS, OF CLEVELAND, OHIO.

EGG-POACHER.

SPECIFICATION forming part of Letters Patent No. 244,415, dated July 19, 1881.

Application filed April 4, 1881. (Model.)

*To all whom it may concern:*

Be it known that I, LORINDA E. ADAMS, a citizen of the United States of America, residing at Cleveland, in the county of Cuyahoga and State of Ohio, have invented certain new and useful Improvements in Egg-Poachers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of this invention is to provide a means for poaching eggs which overcome the existing liability of breaking or injuring their substance while drawing off the water or in removing them from the vessel.

My invention consists in a vessel or pan for poaching eggs, provided with a gate or valve for the ingress and discharge of the water to and from the poaching vessel or pan.

My invention further consists in a vessel or pan for poaching eggs, formed with side openings, in combination with movable gates or slides formed with finger-projections for operating the gates in opening and closing the openings in the vessel or pan.

My invention further consists in the novel construction and combination of the parts, as will be hereinafter described and specifically claimed.

Figure 1:
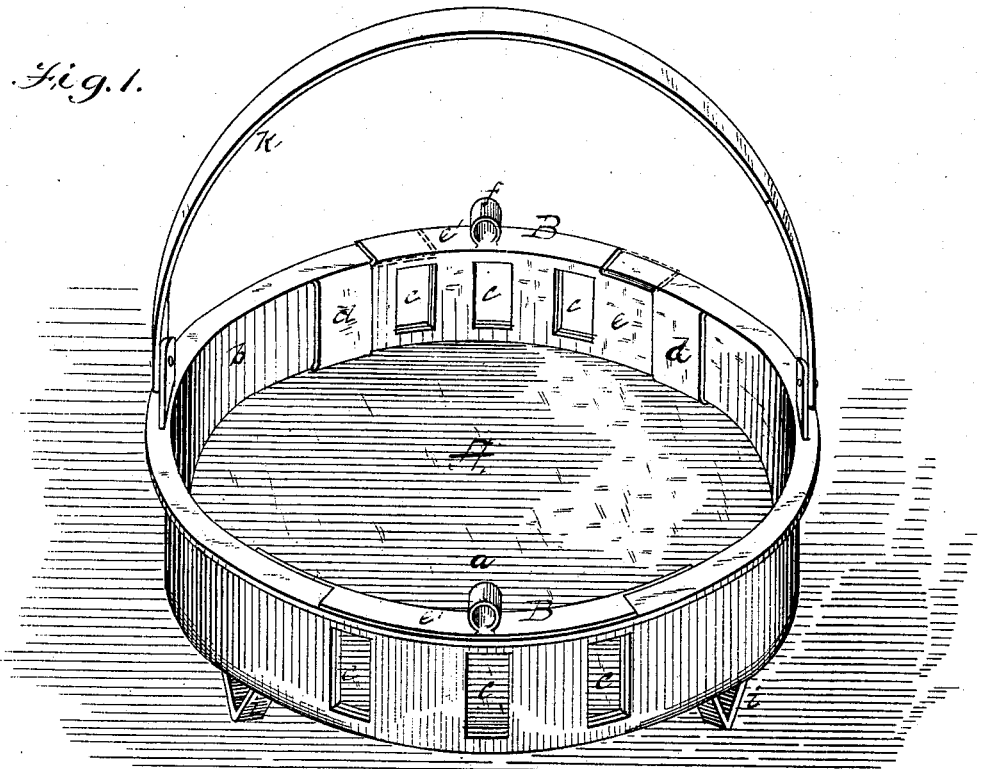
Figure 2:
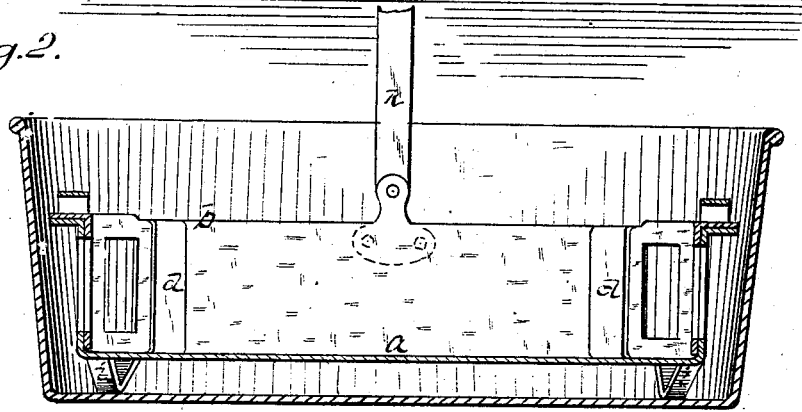

In the annexed drawings, Figure 1 is a perspective view of the poaching-pan. Fig. 2 is a vertical central sectional view of the poaching-pan arranged in a vessel of boiling water; and Fig. 3 is a perspective view of one of the slides.

In the annexed drawings, the letter A represents a pan or vessel struck up of sheet metal into any size—that is to say, of any diameter and depth—and it consists of the bottom $a$ and vertical flange $b$. The vertical wall or flange $b$ of this plan is formed with one or more openings, $c$, arranged, preferably, on opposite sides, for the purposes hereinafter described. To the interior side of the vertical wall, at a short distance from the ends of the openings $c$, are arranged the vertical bars or straps $d$, fastened at the bottom and top, so as to form an intermediate passage-way between the inner face of the pan and the adjacent face of the strap-bars, for the free passage of a sliding valve hereinafter set forth.

Figure 3:
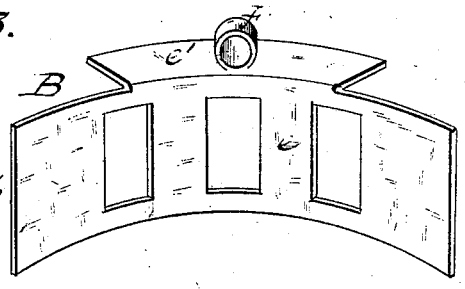

The letter B represents a sliding gate or valve, and it consists of the curved piece $e$, of substantially the same depth as the vertical wall, and formed with the same number of openings or apertures, to correspond to the holes or apertures with which it co-operates, and the horizontal top piece, $e'$, with or without a button, $f$, as shown in Fig. 3 of the drawings. These sliding gates or valves are arranged against the inner wall of the vertical flange and held in position by means of the vertical strips or guide-straps $d$, as seen in Figs. 1 and 2 of the drawings. The poaching-pan is provided with legs or rests $i$, substantially as shown in the drawings. These legs serve for the pan to rest upon when set in the heating-vessel, and are to separate the bottom of the poaching-pan from the bottom of the heating-vessel and for the passage of the heating-water under the same, and thus prevent the contents of the poaching-pan from direct contact with the fire, and avoid liability of scorching the eggs. The poaching-pan is also provided with a handle, $k$, for lowering and raising the pan into and out of the heating-vessel. The heating-vessel consists of a common sheet-metal pan, made of larger dimensions than the poaching-pan, in order that the water may surround the poaching-pan and not be overflowed when the water from the latter is allowed to escape or be too much depleted when the gates are opened and the water is allowed to flow into the poaching-pan. This heating-vessel is not a material part of my invention.

In the operation of poaching eggs it is essential that the cooking be done not too quickly, because, if boiled fast, the whites of the eggs are likely to spread and the yolks break; hence, by the plan of double vessels, the inner of which is heated by the water in the outer, the ebullition is not so violent and these liabilities of breakage are lessened.

The operation of poaching in my improved pan is substantially as follows: The water at boiling-heat having been put in a heating pan or vessel, the poaching-pan with the side apertures closed is set therein, and the water finds its way into the poaching-pan by running into it from the top. The eggs are then broken and dropped in the poaching-pan and cooked until done as desired. The sliding gates are then opened to allow the water to escape, and the poaching-pan is lifted by the handle from the water and the eggs taken out by means of a lifter. For lifting the eggs out, a utensil in the form of a common cake-turner with corrugations or seams extending partly over the surface and a bent-up handle is preferably used. The end of the handle of the lifter may be used to open and close the gates by pressing against the buttons of the slides.

What I claim as my invention, and desire to secure by Letters Patent, is—

1. A poaching pan or vessel having one or more side openings or apertures, in combination with a gate or valve for closing the same, substantially as described.

2. A poaching pan or vessel having one or more side openings or apertures, in combination with a sliding gate or valve for opening or closing the openings for the admission and discharge of water to or from the pan, substantially as described.

3. A poaching pan or vessel having two or more side openings or aperatures, and provided with guide-straps arranged on the inner side of the vertical wall of the pan, in combination with a sliding gate or valve for opening and closing the side openings, and retained in position by means of the guide-straps, substantially as described.

4. A sliding gate or valve for a poaching-pan, consisting of the curved piece e, formed with the apertures, horizontal top piece, e', and button f, substantially as described.

5. As a new article of manufacture, a poaching-pan, consisting of the pan formed with a plurality of side openings, a sliding gate or valve, and a lifting-handle, substantially as described.

In testimony whereof I affix my signature in presence of two witnesses.

LORINDA E. ADAMS.

Witnesses:
R. J. WINTERS,
GEORGIE ADAMS.